United States Patent
Kim (10) Patent No.: US 10,857,986 B2
(45) Date of Patent: Dec. 8, 2020

(54) APPARATUS AND METHOD FOR CONTROLLING BRAKING PRESSURE OF POWERED BOOSTER BRAKE SYSTEM

(71) Applicant: MANDO CORPORATION, Gyeonggi-do (KR)

(72) Inventor: Young Jae Kim, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/487,722

(22) Filed: Apr. 14, 2017

(65) Prior Publication Data
US 2017/0297545 A1  Oct. 19, 2017

(30) Foreign Application Priority Data

Apr. 15, 2016 (KR) .......................... 10-2016-0046431

(51) Int. Cl.
*B60T 13/20* (2006.01)
*B60T 8/40* (2006.01)
(Continued)

(52) U.S. Cl.
CPC .............. *B60T 13/20* (2013.01); *B60T 8/172* (2013.01); *B60T 8/4081* (2013.01); *B60T 13/166* (2013.01); *B60T 13/662* (2013.01); *B60T 17/02* (2013.01); *B60T 7/042* (2013.01); *B60T 2220/04* (2013.01); *B60T 2270/82* (2013.01)

(58) Field of Classification Search
CPC .... B60T 13/20; B60T 13/166; B60T 2270/82; B60T 13/662; B60T 17/02; B60T 8/172; B60T 8/4081
See application file for complete search history.

(56) References Cited

U.S. PATENT DOCUMENTS 6,174,033 B1 * 1/2001 Busch ................... B60T 8/4059
303/10
8,788,172 B2 * 7/2014 Bohm ..................... B60T 7/042
701/78
(Continued)

FOREIGN PATENT DOCUMENTS

CN    202208289    5/2012
CN    102933439    2/2013
(Continued)

OTHER PUBLICATIONS

Office Action dated Apr. 1, 2019 for Chinese Patent Application No. 201710245941.5 and its English machine translation by Google Translate.

*Primary Examiner* — Xuan Lan Nguyen
(74) *Attorney, Agent, or Firm* — Ladas & Parry, LLP (57) ABSTRACT

The present disclosure relates to an apparatus and a method for controlling a braking pressure of a powered booster brake system, the apparatus including a pedal stroke sensor configured to detect a manipulation degree of a brake pedal; an electronic control unit (ECU) configured to calculate a braking pressure using the detection result of the pedal stroke sensor; and a motor configured to move a piston inside a pump to perform a braking operation under control of the ECU, wherein the ECU determines a first position of the piston, which corresponds to the braking pressure, and controls the motor on the basis of a position of the piston.

14 Claims, 6 Drawing Sheets

(51) Int. Cl.
*B60T 8/172* (2006.01)
*B60T 13/16* (2006.01)
*B60T 13/66* (2006.01)
*B60T 17/02* (2006.01)
*B60T 7/04* (2006.01)

(56) References Cited

U.S. PATENT DOCUMENTS

| | | | |
|---|---|---|---|
| 8,974,010 B2* | 3/2015 | Yang | B60T 13/686 |
| | | | 303/113.4 |
| 2003/0020327 A1* | 1/2003 | Isono | B60T 8/4018 |
| | | | 303/113.4 |
| 2007/0138861 A1 | 6/2007 | Kawahara et al. | |
| 2011/0224881 A1* | 9/2011 | Matsushita | B60T 7/042 |
| | | | 701/70 |
| 2012/0062023 A1* | 3/2012 | Ohkubo | B60T 7/042 |
| | | | 303/3 |
| 2013/0080016 A1* | 3/2013 | Bohn | B60T 7/042 |
| | | | 701/78 |
| 2013/0119752 A1* | 5/2013 | Roll | B60T 8/326 |
| | | | 303/189 |
| 2014/0117747 A1* | 5/2014 | Yang | B60T 7/042 |
| | | | 303/6.01 |
| 2014/0117749 A1* | 5/2014 | Yang | B60T 7/042 |
| | | | 303/20 |
| 2015/0183414 A1* | 7/2015 | Kobayashi | B60T 13/662 |
| | | | 303/3 |

FOREIGN PATENT DOCUMENTS

| | | |
|---|---|---|
| CN | 103038110 | 4/2013 |
| CN | 103241233 | 8/2013 |
| JP | 5640498 | 12/2014 |
| KR | 10-2014-0044702 | 4/2014 |

* cited by examiner

APPARATUS AND METHOD FOR CONTROLLING BRAKING PRESSURE OF POWERED BOOSTER BRAKE SYSTEM

CROSS-REFERENCE TO RELATED APPLICATION

This application claims priority to and the benefit of Korean Patent Application No. 2016-0046431, filed on Apr. 15, 2016, the disclosure of which is incorporated herein by reference in its entirety.

BACKGROUND

1. Field of the Invention

The present disclosure relates to an apparatus and a method for controlling a braking pressure of a powered booster brake system, and more particularly, to an apparatus and method for controlling a braking pressure of a powered booster brake system, which are capable of realizing a braking feeling equivalent to that of a mechanical brake system.

2. Discussion of Related Art

Generally, a powered booster brake system is a brake system capable of providing a good braking feeling while effectively using regenerative braking to improve electrical efficiency or fuel efficiency of an electric vehicle (EV) or a hybrid electric vehicle (HEV).

The powered booster brake system is configured to include a pedal stroke sensor for detecting an manipulation of a brake pedal, an electronic control unit (ECU) for converting a detected pressure of the pedal stroke sensor into a braking pressure and controlling a driving part which drives an electrical motor (that is, a motor) according to the converted braking pressure, and a piston which is moved rectilinearly inside a master cylinder according to a rotation of the motor to deliver a pressure to a caliper of each of front and rear wheels.

An example of a typical powered booster brake system is disclosed in Korean Patent Publication No. 10-2014-0044702 (Publication Date: Apr. 15, 2014, entitled "Method for Controlling Driving Output Value of Smart Buster Brake System in Vehicle").

In the above Korean Patent Publication, an ECU calculates a braking pressure using a manipulation detection result of a brake pedal, drives a motor according to the calculated braking pressure, detects a pressure inside a master cylinder according to driving of the motor, and stops the driving of the motor when the detected pressure reaches the braking pressure.

However, in such a typical powered booster brake system, since the ECU continuously detects the pressure inside the master cylinder while the motor operates and continuously compares the detected pressure inside the master cylinder with the braking pressure, there are problems in that a calculation burden on the ECU may be increased, a degradation of pressure control performance may occur, and a braking feeling may be degraded in comparison to a conventional mechanical vacuum brake system.

SUMMARY OF THE INVENTION

To address the above described problem, an apparatus and a method for controlling a braking pressure of a powered booster brake system according to a preferred embodiment of the present disclosure has the following objectives.

First, an objective of the present disclosure is to provide an apparatus and a method for controlling a braking pressure of a powered booster brake system, which are capable of significantly reducing a calculation burden by decreasing the number of times a pressure inside a cylinder is detected.

Also, another objective of the present disclosure is to provide an apparatus and a method for controlling a braking pressure of a powered booster brake system, which are capable of enhancing pressure control performance and providing a braking feeling equivalent to that of a typical mechanical vacuum brake system.

Objectives of the present disclosure are not limited to the above described objectives, and other objectives not mentioned above can be clearly understood by those skilled in the art from the following description.

An apparatus for controlling a braking pressure of a powered booster brake system of the present disclosure includes a pedal stroke sensor configured to detect a manipulation degree of a brake pedal; an electronic control unit (ECU) configured to calculate a braking pressure using the detection result of the pedal stroke sensor; and a motor configured to move a piston inside a pump to perform a braking operation under control of the ECU, wherein the ECU may determine a first position of the piston, which corresponds to the braking pressure, and control the motor on the basis of a position of the piston.

The apparatus may further include a pressure sensor configured to detect a fluid pressure, which is used in the braking operation, in a state in which the piston is moved to the first position, and provide the fluid pressure to the ECU.

The ECU may compare the fluid pressure detected by the pressure sensor with the braking pressure, determine a second position of the piston, which is capable of compensating a difference between the fluid pressure and the braking pressure when the difference occurs therebetween, and drive the motor to move the piston to the second position.

The ECU may include a lookup table in which position information of the piston according to a braking pressure and a required fluid amount are stored so that the first position or the second position may be determined.

The ECU may control a rotational degree and a rotational speed of the motor to move the piston to the first position or the second position and adjust a moving speed.

The ECU may repeat movement control of the piston to compensate for the difference between the fluid pressure, which is detected by the pressure sensor, and the braking pressure.

A method for controlling a braking pressure of a powered booster brake system according to another aspect of the present disclosure includes detecting a manipulation degree of a brake pedal; calculating a braking pressure using the manipulation degree of the brake pedal; and driving a motor according to the braking pressure and performing a braking operation, wherein the driving of the motor may determine a first position of a piston, which is located in a pump, so that the first position corresponds to the braking pressure, and drive the motor on the basis of a position of the piston.

The method may further include detecting a fluid pressure used in the braking operation in a state in which the piston is moved to the first position, and comparing the fluid pressure with the braking pressure; determining a second position for compensating for a difference when the difference occurs between the fluid pressure and the braking pressure; and moving the piston to the second position.

The method may refer to a lookup table in which position information of the piston according to braking pressure and a required fluid amount is stored so that the first position or the second position may be determined.

Movement control of the piston may be repeatedly performed to compensate for the difference between the detected fluid pressure and the braking pressure.

BRIEF DESCRIPTION OF THE DRAWINGS

The above and other objects, features and advantages of the present disclosure will become more apparent to those skilled in the art by describing exemplary embodiments thereof in detail with reference to the accompanying drawings, in which.

DETAILED DESCRIPTION OF EXEMPLARY EMBODIMENTS

Hereinafter, preferred embodiments of the present disclosure will be described in detail with reference to the drawings. The same reference numerals are given to the same or similar components regardless of reference numerals, and a repetitive description thereof will be omitted.

Also, in the following description of the present disclosure, when a detailed description of a known related art is determined to obscure the gist of the present disclosure, the detailed description thereof will be omitted. Further, it should be noted that the accompanying drawings are provided only to ease understanding of the spirit of the present disclosure, and the spirit of the present disclosure is not to be construed as limited to these drawings.

Figure 1:
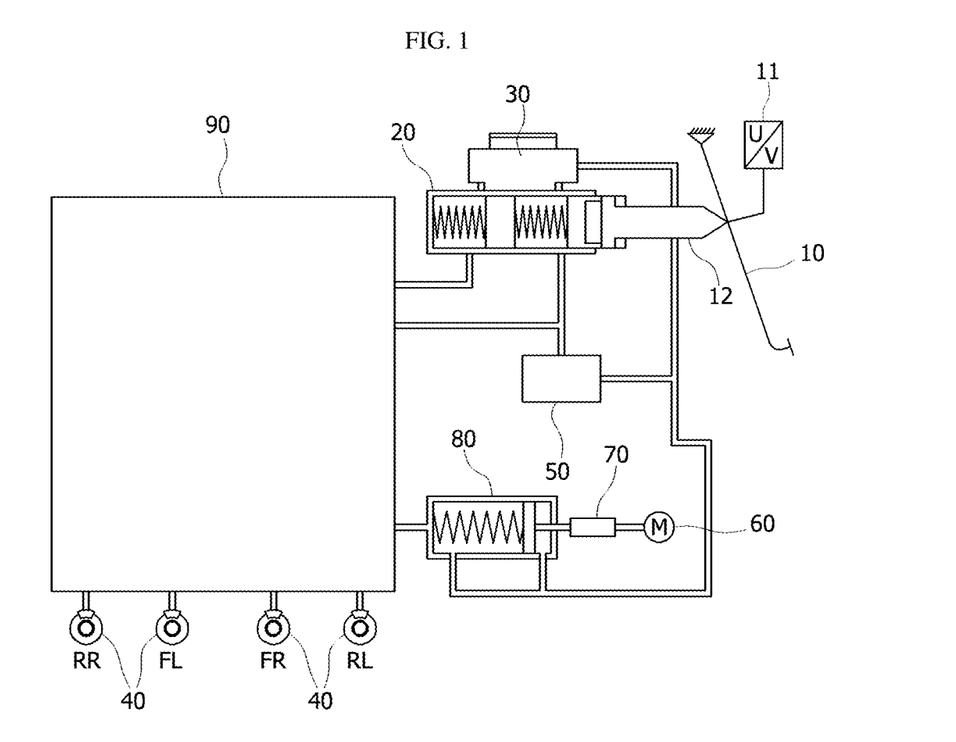
FIG. 1 is a diagram schematically illustrating an integrated type electric brake device.

Prior to describing an actuator assembly of an electric brake device according to various embodiments of the present disclosure, an integrated type electric brake device will be described first with reference to FIG. 1. FIG. 1 is a diagram schematically illustrating the integrated type electric brake device.

As shown in FIG. 1, the electric brake device includes a master cylinder 20, a reservoir 30, wheel cylinders 40, a pedal simulator 50, a motor 60, a gear unit 70, and a pump 80.

The master cylinder 20 serves to generate a hydraulic pressure by being pressurized by an input rod 12 when a driver operates a brake pedal 10. The generated hydraulic pressure is delivered to the pedal simulator 50, and the pedal simulator 50 delivers a reaction force corresponding to the hydraulic pressure to the brake pedal 10 via the master cylinder 20 so that a pedal feeling is provided to the driver. Also, in an emergency in which electric power is not provided to an entire brake system, the hydraulic pressure in the master cylinder 20 may be directly delivered to the wheel cylinders 40 so that a vehicle may be braked.

Meanwhile, in a normal situation, the pump 80 delivers fluid to the wheel cylinders 40, and particularly, when the driver pressurizes the brake pedal 10, a pedal stroke sensor 11 detects and delivers a displacement of the brake pedal 10 to an electronic control unit (ECU), and the ECU drives the motor 60 on the basis of the detected displacement of the brake pedal 10. When a rotational movement which is generated by the motor 60 is converted into a rectilinear movement by the gear unit 70 to pressurize a piston inside the pump 80, fluid accommodated in a chamber of the pump 80 is moved to the wheel cylinders 40.

The reservoir 30 is a component configured to store fluid and be in fluid-communication with the master cylinder 20, the pedal simulator 50, and the pump 80. Also, a hydraulic pressure circuit 90 includes flow paths configured to deliver fluid among the master cylinder 20, the pump 80, and the wheel cylinders 40, which are described above, and valves configured to control fluid flow in the flow paths, and a detailed description of the hydraulic pressure circuit 90 will be omitted.

Figure 2:
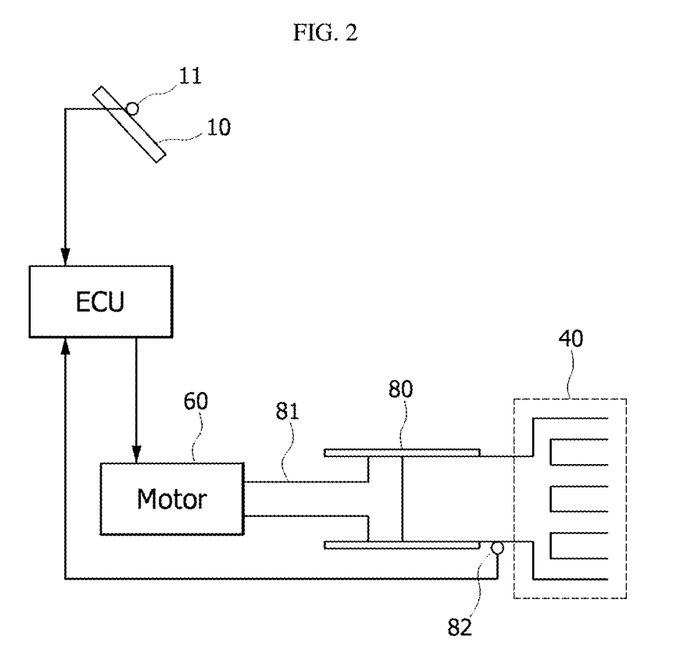
FIG. 2 is a block diagram of an apparatus for controlling a powered booster brake system according to a preferred embodiment of the present disclosure.

FIG. 2 is a block diagram for describing an apparatus for controlling a powered booster brake system according to a preferred embodiment of the present disclosure.

Referring to FIG. 2, the apparatus for controlling a powered booster brake system according to the preferred embodiment of the present disclosure is configured to include the pedal stroke sensor 11 configured to detect a manipulation degree of the brake pedal 10, an ECU configured to receive manipulation degree information of the brake pedal 10, which is detected by the pedal stroke sensor 11, convert the received manipulation degree information into a braking pressure, and determine a position of a piston 81 which corresponds to the braking pressure, the motor 60 configured to change a position of the piston 81 to correspond to the determined position of the piston 81, which is determined by the ECU, the pump 80 configured to deliver a pressure according to a movement of the piston 81 to the wheel cylinders 40, and a pressure sensor 82 configured to detect a pressure inside the pump 80 and provide the detected pressure to the ECU. Here, the ECU determines whether a current position of the piston 81 is an appropriate position by comparing the pressure inside the pump 80, which is provided by the pressure sensor 82, with the braking pressure, and controls the motor 60 to change the current position of the piston 81 when the current position of the piston 81 is determined to be an inappropriate position.

Meanwhile, the pressure sensor 82 may be disposed at an output end of the pump 80 to detect the pressure inside the pump 80.

Hereinafter, a configuration and an operation of the apparatus for controlling a powered booster brake system according to the preferred embodiment of the present disclosure configured as described above will be described in detail.

First, when a driver expresses his or her deceleration intent or stop intent by stepping on the brake pedal 10, the pedal stroke sensor 11 detects manipulation degree information including a depression degree and a depression speed of the brake pedal 10.

The manipulation degree information regarding the brake pedal 10 is transmitted from the pedal stroke sensor 11 to the ECU, and then the ECU calculates a braking pressure corresponding to the manipulation degree information. At this point, the manipulation degree information may include speed information together with pressure information.

Instead of immediately controlling the motor 60 according to the braking pressure, the ECU checks a pre-stored lookup table to calculate position information of the piston 81 inside the pump 80, which corresponds to the braking pressure. The lookup table preferably uses required fluid amount data in a hydraulic pressure circuit of a vehicle, and the lookup table may obtain hydraulic pressure provision information of the pump 80 according to a position of the piston 81 through repeated experiments.

At this point, the lookup table further includes movement speed information of the piston 81 together with the position information of the piston 81 inside the pump 80 according to the braking pressure of the ECU. For convenience of description, the position of the piston 81 inside the pump 80, which is obtained during the above described process, is referred to as a first position.

The lookup table providing a relationship between the braking pressure and the position information may be changed according to a required fluid amount which is necessary to form a braking force and is varied according to a kind of vehicle. That is, even when braking pressures of drivers are the same, the position information of the piston 81 may be different according to a difference of a required fluid amount of each of the vehicles.

Next, the ECU controls the motor 60 to move the piston 81 to the first position. A rotational movement of the motor 60 is converted into a rectilinear movement of the piston 81, and such movement conversion is performed through the gear unit 70, which was described with reference to FIG. 1.

A movement degree and a movement speed of the piston 81 inside the cylinder are determined through controlling a rotational degree and a rotational speed of the motor 60, and a front end part of the piston 81 is moved to the first position by the driving of the motor 60.

Figure 3:
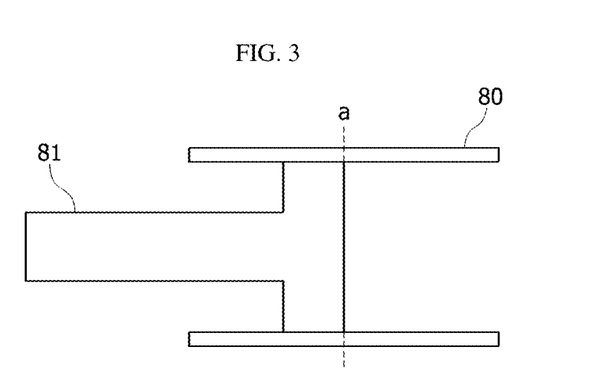
FIG. 3 is a configuration diagram illustrating a state in which a piston is moved to a first position (a) inside a cylinder in the present disclosure.

FIG. 3 is a configuration diagram illustrating a state in which the piston 81 is moved to a first position a inside the pump 80.

In the state of FIG. 3, when a pressure is applied to fluid inside the pump 80 by the movement of the piston 81, the pressure is delivered to the wheel cylinders 40 so that braking is performed according to the pressure.

At this point, a variance of a fluid pressure according to the movement of the piston 81 is detected by the pressure sensor 82. An operation of the pressure sensor 82 is similar to that of each of the above described typical pressure sensors in terms of detecting the fluid pressure inside the pump 80, but there is a significant difference in that the fluid pressure is detected once in a state in which the piston 81 is moved to the first position a in the present disclosure, whereas each of the above described typical pressure sensors continuously detects the fluid pressure while the piston 81 is moved.

That is, a braking control is performed on the basis of the position of the piston 81 inside the pump 80 in the present disclosure unlike being performed on the basis of a fluid pressure in the related art so that the number of times the fluid pressure is detected through the pressure sensor 82 may be significantly reduced.

Owing to such a reduction in the number of times the fluid pressure is detected, the present disclosure may significantly reduce a calculation burden on the ECU.

The fluid pressure detected by the pressure sensor 82 is provided to the ECU, and then the ECU checks whether the fluid pressure which is currently detected at the pressure sensor 82 corresponds to an initially calculated braking pressure. On the basis of a determination of the ECU, the ECU determines that the braking operation according to the manipulation of the brake pedal 10 is complete when the detected fluid pressure corresponds to the initially calculated braking pressure, whereas, the ECU re-determines a compensation position of the piston 81 using a difference between the detected fluid pressure and the initially calculated braking pressure when the detected fluid pressure does not correspond to the initially calculated braking pressure.

The ECU may determine that there is a need to move the piston 81 forward when the detected fluid pressure is determined to be less than the initially calculated braking pressure, whereas the ECU may determine that there is a need to move the piston 81 backward when the detected fluid pressure is determined to be greater than the initially calculated braking pressure.

At this point, a position movement degree of the piston 81 is determined by the difference between the detected fluid pressure and the initially calculated braking pressure, and the ECU determines a new position of the piston 81 with reference to the lookup table. For convenience of description, the new position of the piston 81 will be referred to as a second position and will be described below.

Figure 4:
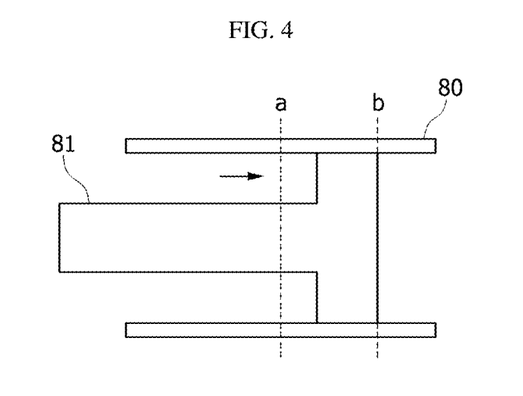
FIGS. 4 and 5 are each configuration diagrams illustrating a state in which the piston is moved to a second position (b) according to compensation of a position from the state of FIG. 3.
Figure 5:
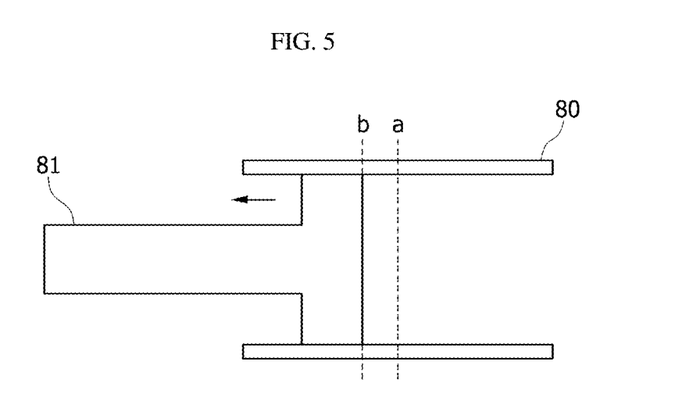

FIGS. 4 and 5 are each configuration diagrams illustrating a state in which the piston 81 is moved to a second position b according to compensation of a position from the state of FIG. 3.

FIG. 4 is an example of a case in which the fluid pressure detected by the pressure sensor 82 is determined to be less than the initially calculated braking pressure in a state in which the piston 81 is moved to the first position a in the pump 80. The ECU determines the second position b, which is a new position of the piston 81, and then controls the motor 60 to move the piston 81 to the second position b so that the detected fluid pressure corresponds to the initially calculated braking pressure.

Through such operations, a braking operation corresponding to the manipulation of the brake pedal 10 by the driver may be performed.

As an alternative to the case shown in FIG. 4, FIG. 5 is an example of a case in which the fluid pressure detected by the pressure sensor 82 is determined to be greater than the initially calculated braking pressure, and the ECU determines the second position b, which is a new position of the piston 81, and then controls the motor 60 to move the piston 81 to the second position b so that the detected fluid pressure corresponds to the initially calculated braking pressure.

In addition, the ECU may repeat a process of re-detecting a fluid pressure using the pressure sensor 82 in a state in which the piston 81 has been moved to the second position b, checking whether the fluid pressure, which is re-detected, corresponds to the initially calculated braking pressure, and then determining a position of the piston 81 according to the result of the checking.

As is described above, in accordance with the present disclosure, since the braking operation is performed on the basis of a position of the piston and not a pressure, a continuous detection of the pressure may not be required, and thus a burden on the ECU may be reduced.

Also, a position-based control, instead of a pressure-based control, is performed so that braking pressure control performance and stability of the electric motor may be improved and a braking feeling equivalent to that of a mechanical brake system may be implemented.

Figure 6:
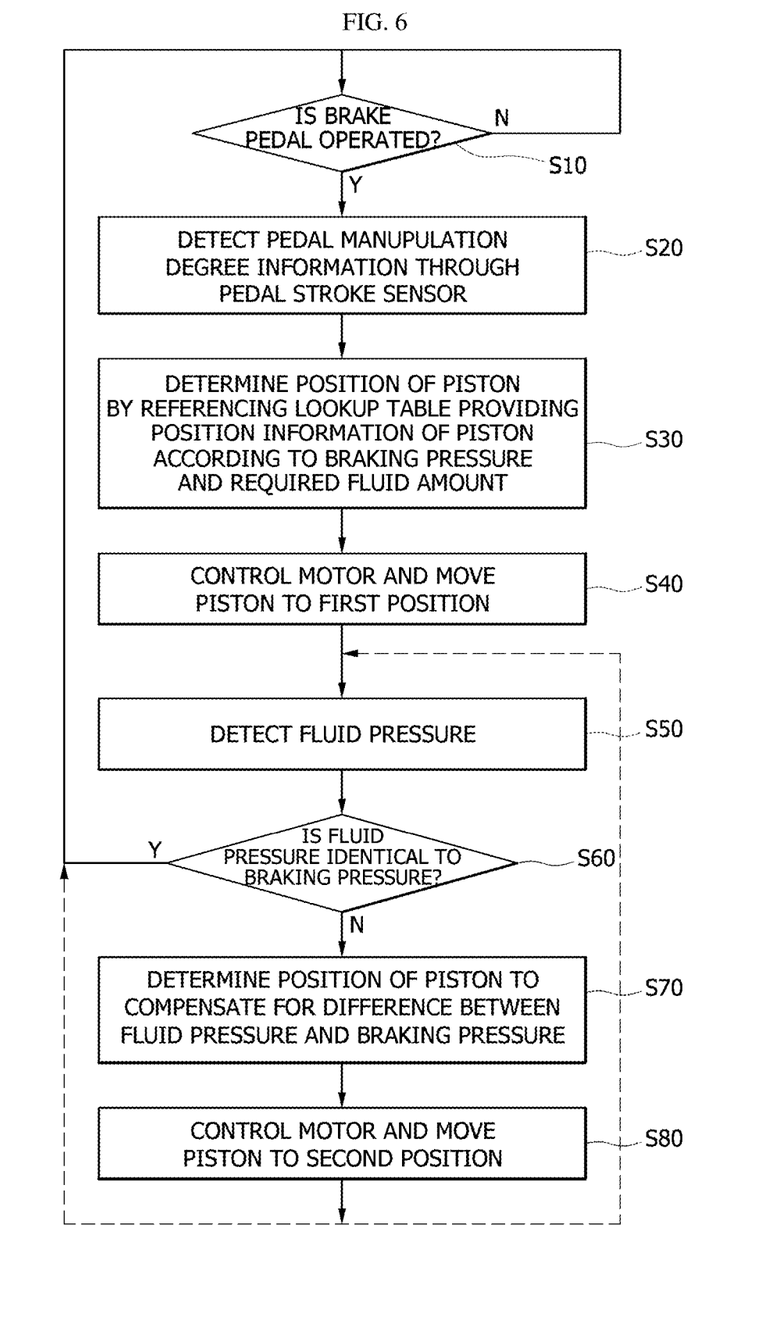
FIG. 6 is a flowchart of a method for controlling a powered booster brake system according to the preferred embodiment of the present disclosure.

FIG. 6 is a flowchart of a method for controlling a braking pressure of a powered booster brake system according to the preferred embodiment of the present disclosure.

Referring to FIG. 6 and FIG. 2, the method for controlling a braking pressure of a powered booster brake system according to the preferred embodiment of the present disclosure is configured to include checking whether the brake pedal 10 is operated in Operation S10, detecting pedal manipulation degree information through the pedal stroke sensor 11 when the brake pedal 10 is operated in Operation S20, calculating a braking pressure and then determining a first position of the piston 81 with reference to a lookup table by an ECU in Operation S30, controlling the motor 60 to move the piston 81 to the first position inside the pump 80 in Operation S40, detecting a fluid pressure in the pump 80 through the pressure sensor 82 in Operation S50, determining, by the ECU, whether the detected fluid pressure and the braking pressure are the same and returning to Operation S10 when the detected fluid pressure and the braking pressure are the same in Operation S60, determining a second position of the piston 81 to compensate for a difference between the detected fluid pressure and the braking pressure when, as the determination result of Operation S60, the detected fluid pressure and the braking pressure are not the same in Operation S70, and compensating for the difference therebetween by driving the motor 60 to move the piston 81 to the second position in Operation S80.

After performing Operation S80, according to a setting, the method may return to Operation S10 along Route A, or, for the purpose of performing a more accurate braking control, the method may return to Operation S50 and proceed along Route B which repeatedly compensate for the difference between the detected fluid pressure and the braking pressure. When proceeding along Route B, the method may be configured so that the number of iteration times is set and, when the number of iteration times is achieved, the method returns to Operation S10 along Route A, and does not proceed along Route B any more.

Hereinafter, a configuration and an operation of the method for controlling a braking pressure of a powered booster brake system according to the preferred embodiment of the present disclosure will be described in more detail below.

First, when the brake pedal 10 is stepped on by a driver and thus braking of a vehicle by the driver is detected in Operation S10, the pedal stroke sensor 11 detects pedal manipulation degree information including manipulation degree and speed information of the brake pedal 10 in Operation S20.

Thereafter, an ECU calculates a braking pressure for braking using the pedal manipulation degree information received from the pedal stroke sensor 11 in Operation S30. At this point, braking speed information may be included in the braking pressure.

After calculating the braking pressure, the ECU determines a first position, which is a position of the piston 81 corresponding to the braking pressure, with reference to a lookup table.

The lookup table expresses position information of the piston 81 with respect to the braking pressure, and the position information of the piston 81 which is provided from the lookup table with respect to the braking pressure may vary according to a required fluid amount which varies according to a kind of vehicle. That is, even when braking pressures of vehicles are the same, the position information of the piston 81 may be changed according to a difference in required fluid amount of each of the vehicles, and the lookup table provides the position information of the piston 81 with respect to required fluid amount data and the braking pressure.

Next, the ECU controls the motor 60 to move the piston 81 to the first position in the pump 80 in Operation S40. The controlling of the motor 60 may include controlling a rotational degree and rotational speed thereof.

As is described above, the present disclosure performs control of the braking pressure on the basis of a position control of the piston 81.

Thereafter, in a state in which the piston 81 is located at the first position, the ECU detects a fluid pressure in a hydraulic pressure circuit including the pump 80 or the wheel cylinders 40 using the pressure sensor 82 in Operation S50.

The pressure sensor 82 detects the fluid pressure in the hydraulic pressure circuit in a state in which the piston 81 is moved to the first position but is not required to continuously detect the fluid pressure as in a typical pressure-based braking control method, and detects the fluid pressure once in the state in which the piston 81 is moved to the first position.

Therefore, in comparison to the typical pressure-based braking control method which should continuously detect a pressure and compare the detected pressure with a braking pressure, a calculation burden on the ECU may be reduced.

Afterward, in Operation S60, the ECU checks whether the fluid pressure detected in Operation S50 is appropriate by comparing the detected fluid pressure with the braking pressure obtained in Operation S30. At this point, the ECU may be determined whether the fluid pressure is identical to the braking pressure, and alternatively, the ECU may predetermine an error range and then determine that the fluid pressure is appropriate when a difference between the fluid pressure with the braking pressure falls within the error range.

When the currently detected fluid pressure is determined to be an appropriate pressure with respect to the braking pressure as the determination result in Operation S60, the ECU returns to Operation S10 to recheck whether the brake pedal 10 is operated.

Meanwhile, when the fluid pressure detected in Operation S50 is different from the braking pressure obtained in Operation S30 or the difference between the fluid pressure with the braking pressure falls out of the error range as the determination result in Operation S60, the ECU determines a second position of the piston 81, which is capable of compensating for the difference between the detected fluid pressure and the braking pressure, in Operation S70.

The second position may also be determined with reference to the lookup table.

Next, as in Operation S80, the ECU drives the motor 60 to move the piston 81 to the second position, thereby performing a braking operation reflecting a first intent of the driver manipulating the brake pedal 10.

The process after Operation S80 may be changed according to a setting. After performing Operation S80, the process may return to Operation S10 along Route A, or may re-perform Operation S50 along Route B.

It may be understood that, when the process follows Route A, the present disclosure moves the piston 81 to the first position, compensates for an error once, and moves the piston 81 to the second position, thereby appropriately performing the braking operation, whereas, when the process follows Route B, the present disclosure repeats the process until the difference between the detected fluid pressure and the braking pressure falls within the error range to enable a braking operation that is closer to the intent of the driver to be performed.

Even when the process follows Route B, it is preferable for a maximum number of repetition times to be set and the process to be set to follow Route A when the number of times the process is repeated reaches the maximum number of repetition times.

In accordance with an apparatus and a method for controlling a powered booster brake system of the present disclosure, there is an effect in which continuously detecting a pressure in a cylinder and repeatedly comparing the detected pressure with a braking pressure may be omitted by determining a movement position and a speed of a piston inside the cylinder using the braking pressure, moving the piston to the movement position by driving a motor, detecting the pressure in the cylinder in a state in which the piston is moved to the movement position, comparing the detected pressure with the braking pressure, and compensating a position of the piston according to the comparison result so that a calculation burden may be reduced.

Also, in accordance with the apparatus and the method for controlling a powered booster brake system of the present disclosure, there is an effect in which an operation control of a motor is performed on the basis of a position-based control method which moves a piston to a determined position so that braking pressure control performance and stability may be improved in comparison to those of a typical pressure-based control method.

Further, owing to the improvement of the braking pressure control performance and stability, a braking pressure control which corresponds to a braking request input through a brake pedal by a driver may be performed so that there is an effect in which a braking feeling equivalent to a mechanical vacuum brake system may be realized.

The embodiments described herein and the accompanying drawings are merely illustrative of some of the technical spirit included in the present disclosure. The embodiments disclosed herein, therefore, are not to be taken in a sense of limiting the technical spirit of the present disclosure but as an explanation thereof, and the range of the technical spirit is not limited to these embodiments. It should be understood that modified and concrete embodiments can be easily devised by those skilled in the art that without departing from the spirit and scope of the present disclosure within the technical spirit of the description and the accompanying drawings of the present disclosure, and that these modified and concrete embodiments are included in the scope and spirit of the present disclosure.

What is claimed is:

1. An apparatus for controlling a braking pressure of a powered booster brake system, comprising:
   a pedal stroke sensor configured to detect a manipulation degree of a brake pedal;
   an electronic control unit configured to calculate the braking pressure of the powered booster brake system using the detection result of the pedal stroke sensor; and
   a motor configured to move a piston inside a pump to perform a braking operation under control of the ECU,
   wherein the ECU determines a first position of the piston based on the calculated braking pressure of the powered booster brake system, and controls the motor to move the piston to the first position of the piston determined based on the calculated braking pressure of the powered booster brake system,
   wherein the apparatus further comprises a pressure sensor configured to detect a fluid pressure in the pump, which is used in the braking operation, in a state in which the piston is moved to the first position, and provide the fluid pressure to the ECU, and
   wherein the ECU compares the fluid pressure detected by the pressure sensor with the braking pressure, determines a second position of the piston, which is capable of compensating for a difference between the fluid pressure and the braking pressure when the difference occurs therebetween, and drives the motor to move the piston to the second position.

2. The apparatus of claim 1, wherein, when the difference between the fluid pressure and the braking pressure falls within an error range, the ECU determines the first position as a normal position and stops movement control of the piston.

3. The apparatus of claim 1, wherein the ECU determines the first position or the second position using a lookup table in which position information of the piston according to braking pressure is stored.

4. The apparatus of claim 3, wherein the position information of the piston stored in the lookup table is changed according to a required fluid amount which is necessary to form a braking force of a vehicle.

5. The apparatus of claim 1, wherein the ECU repeats movement control of the piston to compensate for the difference between the fluid pressure, which is detected by the pressure sensor, and the braking pressure.

6. A method for controlling a braking pressure of a powered booster brake system, comprising:
   detecting a manipulation degree of a brake pedal;
   calculating the braking pressure of the powered booster brake system using the manipulation degree of the brake pedal;
   determining a first position of the piston based on the calculated brake pressure of the powered booster brake system;
   driving a motor to move the piston to the first position of the piston determined based on the calculated braking pressure of the powered booster brake system; and
   detecting a fluid pressure used in the braking operation in a state in which the piston is moved to the first position, and comparing the fluid pressure with the braking pressure, determining a second position for compensating for a difference when the difference occurs between the fluid pressure and the braking pressure, and moving the piston to the second position.

7. The method of claim 6, wherein the first position or the second position is determined using a lookup table in which position information of the piston according to braking pressure is stored.

8. The method of claim 6, wherein movement control of the piston is repeatedly performed to compensate for the difference between the detected fluid pressure and the braking pressure.

9. The apparatus of claim 1, wherein the ECU determines the first position of the piston using a lookup table storing associations between positions of the piston and braking pressures.

10. The method of claim 6, wherein the first position of the piston is determined using a lookup table storing associations between positions of the piston and braking pressures.

11. The apparatus of claim 1, wherein the ECU controls the motor using a lookup table storing positions of the piston and movement speeds of the piston with respect to braking pressures.

12. The method of claim 6, wherein the driving the motor further comprises driving the motor using a lookup table storing positions of the piston and movement speeds of the piston with respect to braking pressures.

13. The apparatus of claim 1, wherein the pedal stroke sensor is configured to detect the manipulation degree of the brake pedal including a depression degree and a depression speed of the brake pedal.

14. The method of claim 6, wherein the manipulation degree of the brake pedal includes a depression degree and a depression speed of the brake pedal.

* * * * *